United States Patent
Gradu et al.

(10) Patent No.: US 7,175,350 B2
(45) Date of Patent: Feb. 13, 2007

(54) THERMALLY COMPENSATED BEARING SYSTEM

(75) Inventors: Mircea Gradu, Massillon, OH (US); John Feltman, Lodi, OH (US); Sharon E. Ross, Canton, OH (US); Tim Schlernitzauer, Canton, OH (US)

(73) Assignee: The Timken Company, Canton, OH (US)

( * ) Notice: Subject to any disclaimer, the term of this patent is extended or adjusted under 35 U.S.C. 154(b) by 85 days.

(21) Appl. No.: 11/036,456

(22) Filed: Jan. 14, 2005

(65) Prior Publication Data

US 2005/0207689 A1    Sep. 22, 2005

Related U.S. Application Data

(60) Provisional application No. 60/553,772, filed on Mar. 17, 2004.

(51) Int. Cl.
*F16C 19/52* (2006.01)
(52) U.S. Cl. ......................... 384/557; 384/905
(58) Field of Classification Search ................ 384/493, 384/557, 905, 564, 571
See application file for complete search history.

(56) References Cited

U.S. PATENT DOCUMENTS

| | | | |
|---|---|---|---|
| 3,311,431 A | 3/1967 | Hilliard | |
| 3,561,829 A | 2/1971 | Heldt | |
| 4,775,325 A | 10/1988 | Wilson | |
| 4,895,462 A | 1/1990 | Takata | |
| 4,923,313 A * | 5/1990 | Bergling | ...................... 384/571 |
| 5,286,117 A * | 2/1994 | Wojan et al. | ................ 384/571 |
| 5,681,118 A * | 10/1997 | Armstrong et al. | ......... 384/513 |
| 5,826,987 A | 10/1998 | Beaman | |
| 5,829,891 A | 11/1998 | Beaman | |
| 5,999,373 A | 12/1999 | Allsup et al. | |
| 6,273,614 B1 | 8/2001 | Nicot | |
| 6,293,704 B1 | 9/2001 | Gradu | |

FOREIGN PATENT DOCUMENTS

| | | |
|---|---|---|
| EP | 07279954 | 10/1995 |
| EP | 08312760 | 11/1996 |
| FR | 2841522 | 1/2004 |
| GB | 2027135 A | 2/1980 |
| JP | 8312760 | 11/1996 |

\* cited by examiner

*Primary Examiner*—Thomas R. Hannon
(74) *Attorney, Agent, or Firm*—Polster, Lieder, Woodruff & Lucchesi, L.C.

(57) ABSTRACT

A shaft rotates in a housing on two single row tapered roller bearings mounted in opposition such that the raceways of the one bearing taper downwardly toward the raceways of the other bearing. The metal from which the housing is formed has a higher coefficient of thermal expansion than the metal from which the shaft and bearings are formed. The bearings are set to preload to stabilize the axis of rotation. To prevent the cups (outer races) of the bearings from becoming loose as a consequence of differential thermal expansion between the housing and shaft, the cups are provided with beveled back faces which abut beveled shoulders at the ends of bearing seats in the housing. As the housing expands radially and perhaps eliminates radial interference fits between the cups and housing, the housing also expands axially and maintains the beveled shoulders of the bearing seats firmly abutted against the beveled back faces of the cups, so that the cups do not displace either axially or radially.

18 Claims, 4 Drawing Sheets

THERMALLY COMPENSATED BEARING SYSTEM

CROSS REFERENCE TO RELATED APPLICATIONS

This application derives priority from U.S. provisional application 60/553,772 of Mircea Gradu et al., filed Mar. 17, 2004 and entitled "Thermally Compensated Bearing System", from which priority is claimed.

STATEMENT REGARDING FEDERALLY SPONSORED RESEARCH OR DEVELOPMENT

Not Applicable.

BACKGROUND OF THE INVENTION

This invention relates in general to bearing systems for mounting shafts in housings and, more particularly, to a bearing system that compensates for differential thermal expansion between a shaft and a housing.

Machines of a wide variety utilize rotating shafts to achieve the purposes for which they are designed. Typically, the shaft rotates in a housing on antifriction bearings—often tapered roller bearings arranged in pairs and in opposition so that the bearings not only transfer radial loads between the shaft and housing, but axial or thrust loads as well. The shafts and bearings are usually made from steel, but it is not unusual to find the housings made from a different metal, such as aluminum, with a higher coefficient of thermal expansion.

To give the steel shaft a measure of stability, so that its axis of rotation remains fixed with respect to the housing in which it rotates, the bearings should be set to light preload. This eliminates all clearances within the bearings themselves. Moreover, the races of the bearings should be installed over the shaft and within the housing with interference fits. This eliminates all clearances between the races and the shaft and housing. However, as the temperature of the shaft and housing rises, usually as a consequence of friction generated during operation, the housing grows more than the shaft and the bearings and the outer races may become loose in the housing. This destabilizes the axis of rotation.

The typical automotive differential for rear wheel drive vehicles certainly demonstrates the problem. It has an aluminum housing to save weight and a steel pinion shaft which rotates in the housing on two single row tapered roller bearings that are mounted in the indirect configuration, that is to say with the rollers of the two rows tapering downwardly toward each other. When the temperature of the differential rises, the housing expands more than the shaft and the cups (outer races) of the two bearings may become loose in the housing.

DETAILED DESCRIPTION OF INVENTION

Figure 1:
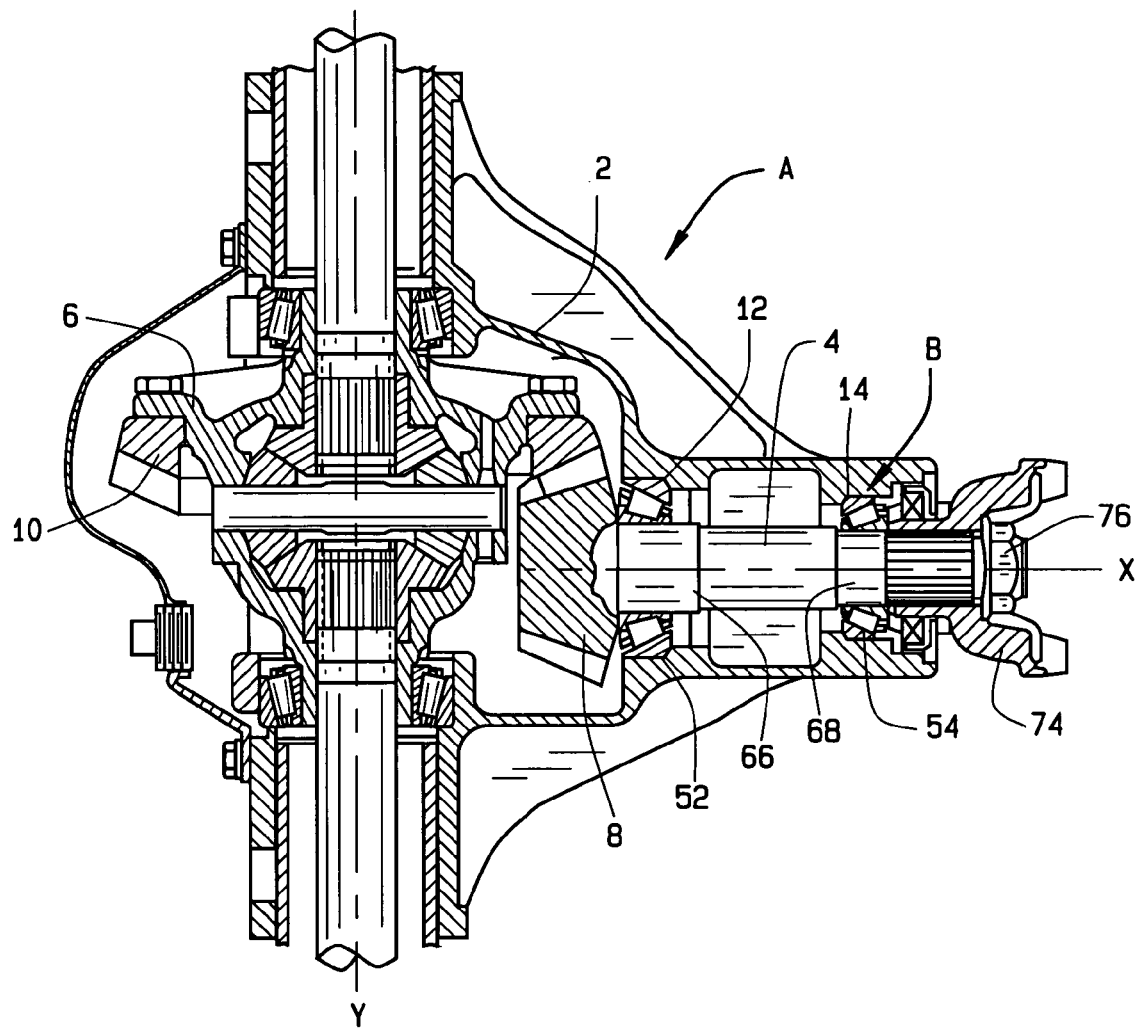
FIG. 1 is a sectional view of an automotive differential provided with a thermally compensated bearing system constructed in accordance with and embodying the present invention.

Referring now to the drawings, an automotive differential A (FIG. 1) includes a housing 2 and, within the housing 2, a pinion shaft 4, which rotates about a longitudinal axis X, and a carrier 6, which rotates about a transverse axis Y. The pinion shaft 4 carries a pinion 8 which meshes with a ring gear 10 on the carrier 6. The differential A is located between a drive shaft, which is coupled to the pinion shaft 4, and two axle shafts which are coupled to the carrier 6, thus serving to transfer torque from the drive shaft to the axle shafts. The pinion shaft 4 is supported in the housing 2 by a bearing system B that includes two single row tapered roller bearings 12 and 14 that are mounted in the indirect configuration, the former being in a head position next to the pinion 8 and the latter in a tail position at the end of the housing 2. Normally, the head bearing 12 is larger than the tail bearing 14, although they may be the same. The pinion shaft 4 and bearings 12 and 14 are formed from steel, whereas the housing 2 is formed from a lighter metal, such as aluminum, having a higher coefficient of thermal expansion.

Figure 3:
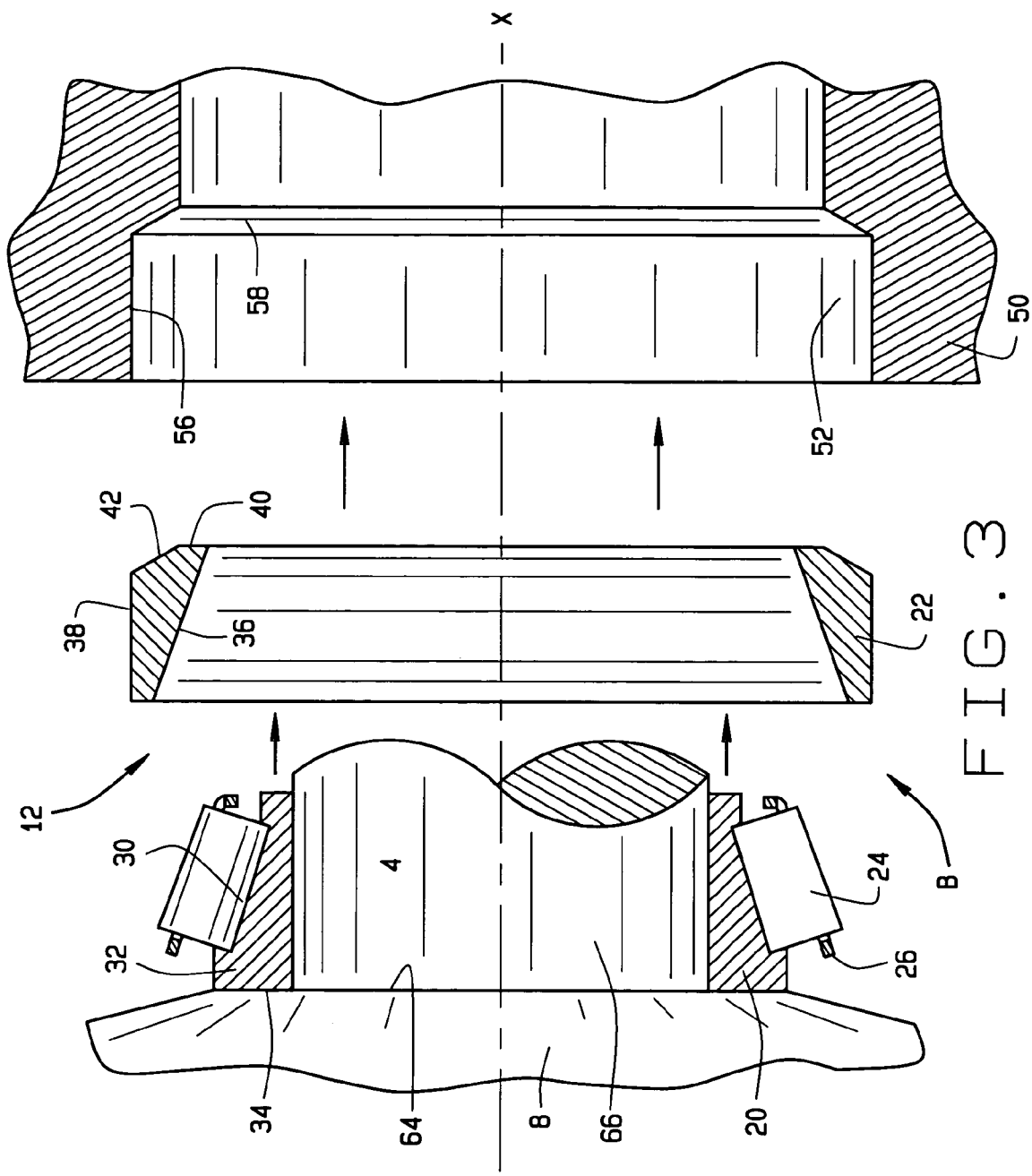
FIG. 3 is an exploded view of one of the bearings in the bearing system and the seat in which it is received.

Each of the bearings 12 and 14 includes (FIG. 3) an inner race in the form of a cone 20 that fits over the pinion shaft 4, an outer race in the form of a cup 22 that fits into the housing 2, and rolling elements in the form of tapered rollers 24 that are organized in a single row between the cone 20 and cup 22. In addition, each has a cage 26 that separates the rollers 24 and maintains the correct spacing between them.

Figure 2:
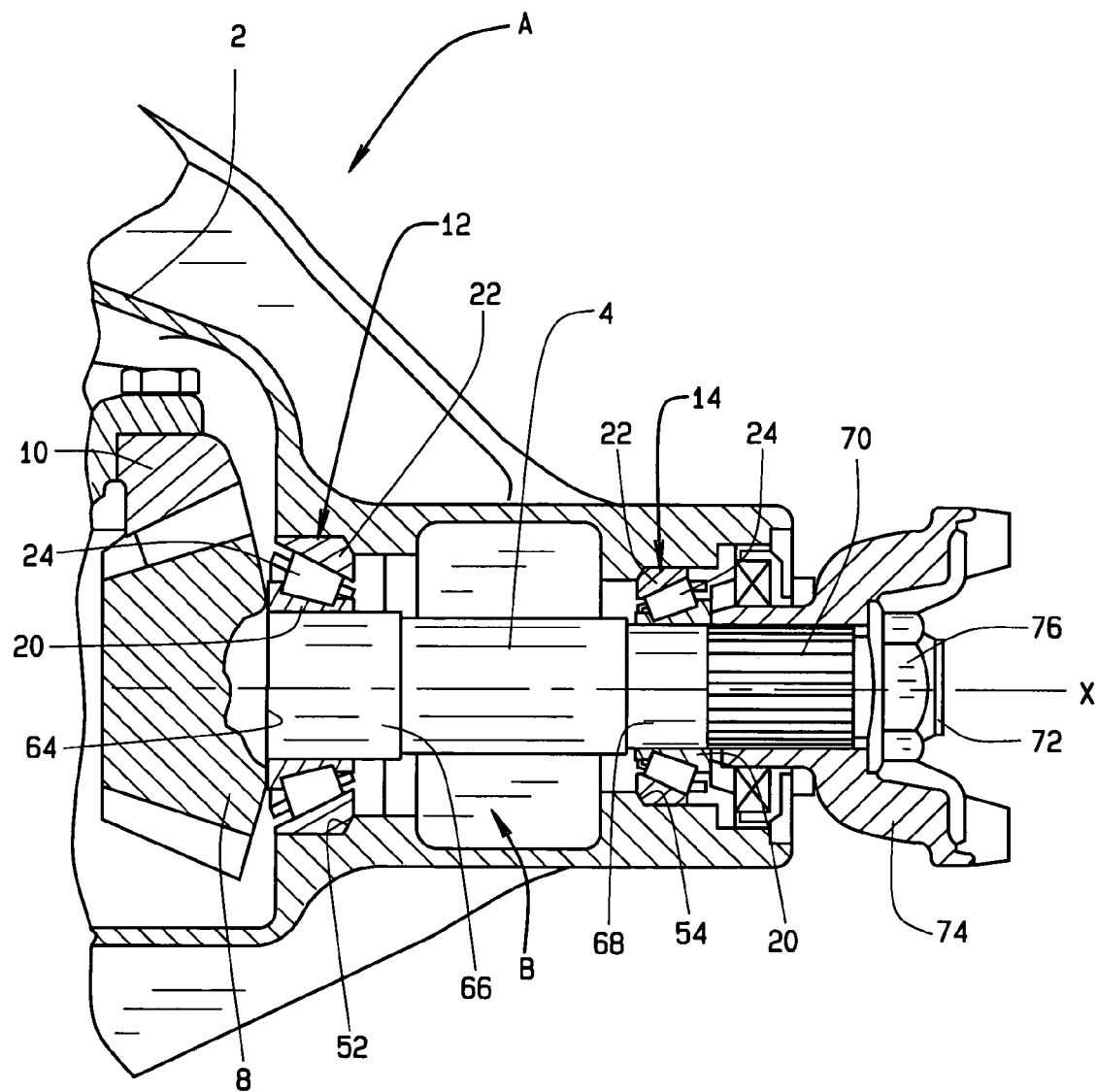
FIG. 2 is a fragmentary sectional view of the differential showing the bearing system enlarged.
Figure 4:
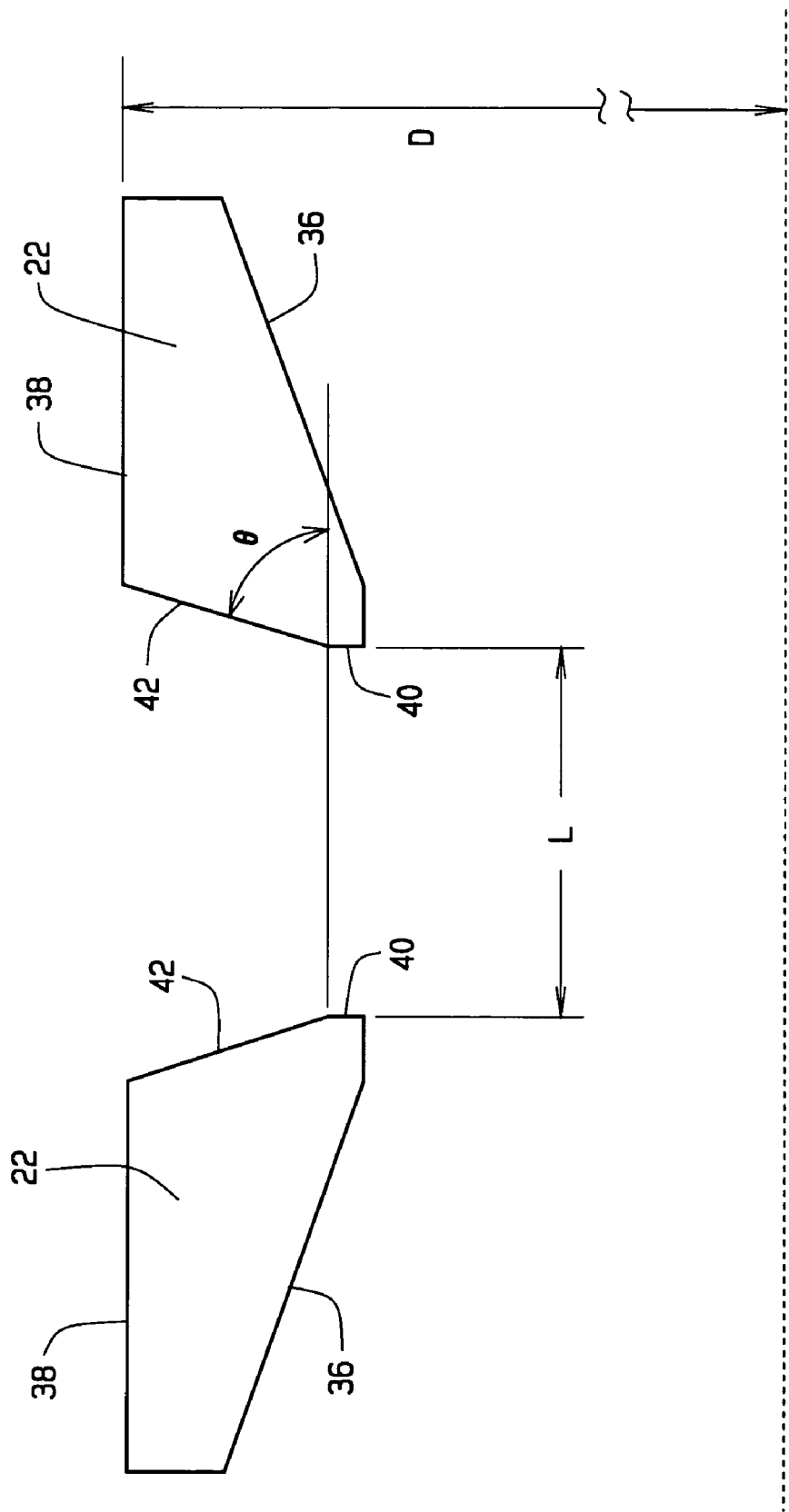
FIG. 4 is a schematic view of the cups for the bearing system showing the angles of their back faces.

The cone 20 has a tapered raceway 30 that is presented outwardly away from the axis X. It leads up to a thrust rib 32 which in turn leads out to a back face 34 that lies in a plane perpendicular to the axis X. The cup 22 likewise has a tapered raceway 36, but it is presented inwardly toward the raceway 30 on the cone 20. The cup 22 also has an exterior surface 38 that is preferably cylindrical with a diameter D, although it may be slightly tapered. The tapered raceway 36 of the cup tapers downwardly to an end face 40 which is squared off with respect to the axis X, and the end face 40 leads out to a beveled or conical back face 42 that extends between the end face 40 and the cylindrical exterior surface 38. Actually, the end face 40 may be eliminated such that the back face 42 occupies the entire end of the cone 20. The back face 42 lies at an angle T (FIG. 4) with respect to the axis X. The tapered rollers 24 fit between the cone 20 and cup 22 with their tapered side faces contacting the raceways 30 and 36 and their large end faces bearing against that thrust rib 32 (FIG. 2). The rollers 24 are on apex, meaning that the conical envelopes in which their side faces lie have their apices at the same location along the axis X and so do the conical envelopes for the raceways 30 and 36.

The housing 2 includes (FIG. 2) a tubular extension 50 which projects away from the carrier 6 and houses the pinion shaft 4. The extension 50 contains two bearing seats 52 and 54, the former for the head bearing 12 and the latter for the tail bearing 14. Each seat 52 and 54 possesses (FIG. 3) a bore 56 that at one end opens out of an end of the extension 50 and a beveled or conical shoulder 58 at its opposite end, there being an included angle T between the conical surface of the shoulder 58 and the axis X. The bore 52 generally corresponds in configuration to the shape of the exterior surface 38 of the cup 22 for the bearing 12 or 16 which fits into the bore 56. The two beveled shoulders 58 at their smallest diameters are spaced apart a distance L (FIG. 4) at ambient temperatures.

With respect to the bearing seat 50 for the head bearing 12, at ambient temperatures its diameter is preferably slightly smaller than the diameter D of the exterior surface 38 on the cup 22 of the head bearing 12, assuming of course that the exterior surface 38 and bore are cylindrical. The angle T, however, is the same for the conical back face 42 on the cup 22 preferably of the head bearing 12 and for the shoulder 58 of the seat 50. Thus, at ambient temperatures the cup 22 fits into the bearing seat 50 with an interference fit between the exterior surface 38 of the cup 22 and the cylindrical surface of the bore 56. Indeed, the cup 22 is pressed into the seat 52 until its back face 42 abuts the conical shoulder 58 at the end of the seat 52. The same relationships exist between the bearing seat 52 and the cup 22 of the tail bearing 14. Ambient temperature basically means the room temperature at which the bearing system B is assembled.

The pinion shaft 4 extends through (FIG. 2) the tubular extension 50 of the housing 2, and at its inner end the pinion 8 is formed integral with it. The pinion 8 provides a shoulder 64 at that end of the shaft 4, with the shoulder 64 being squared off with respect to the axis X. The shaft 4 also has a bearing seat 66 that leads up to the shoulder 64 and remote from that seat 66, another seat 68. The spacing between the two seats 66 and 68 generally corresponds to the spacing between the seats 52 and 54 in the tubular extension 50 of the housing 3, and indeed the shaft seat 66 lies within the housing seat 52, whereas the shaft seat 68 lies within the housing seat 54. Beyond the seat 68 the pinion shaft 4 has a spline 70, and beyond the spline 70 it has a threaded end 72. Fitted over the spline 70 is a drive flange 74 which is secured by a nut 76 that threads over the threaded end 72. Other arrangements are possible.

The cone 20 of the head bearing 12 fits over the seat 52 of the shaft 4 with an interference fit, typically abutting the shoulder 64 at its back face 34 (FIG. 2), although a shim or some other spacing device may be interposed between the two. The rollers 24 of the head bearing 12, along their side faces contact the raceways 30 and 36 of the cone 20 and cup 22, respectively, whereas the large end faces of the rollers 24 bear against the thrust rib 32 on the cone 20. The cone 20 of the tail bearing 14 fits over the other bearing seat 68 on the shaft 4 preferably with an interference fit. The rollers 24 of the tail bearing 14, along their tapered side faces, contact the tapered raceways 30 and 36 on the cone 50 and cup 52, respectively, of the tail bearing 14, while the large end faces of the rollers 24 bear against the thrust rib 32.

The nut 74 and drive flange 74 hold the arrangement together. To this end, the drive flange 74 bears against the back face 34 for the cone 20 of the tail bearing 14, whereas the nut 76 secures the drive flange 74 to the pinion shaft 4 such that the axial position of the flange 72 on the shaft 4 is fixed. The two cones 20 thus are captured between the shoulder 64 on the pinion 8 and the drive flange 74 and assume fixed positions on the shaft 4. Indeed, the position of the drive flange 4 on the shaft 4 controls the setting of the two bearings 12 and 14, which is preferably slight preload. Assuming that the bearings 12 and 14 are set in preload, the rollers 24 are captured snugly between their respective raceways 30 and 36 for the full circumferences of those raceways. This eliminates all clearances in the bearings 12 and 14, so the shaft 4 cannot displace radially or axially with respect to the housing 2, yet can rotate with minimal friction in the housing 2 about the axis X. Thus, the axis X remains fixed with respect to the housing, 2 and the pinion 8 rotates about the fixed axis X.

The pinion shaft 4 and the bearings 12 and 14 are machined or otherwise formed from steel, and thus will expand and contract at the same rate with temperature changes. Thus, interference fits between the shaft 4 and the cones 20 of the two bearings 12 and 14 remain as the differential A undergoes changes in temperature. However, the housing 2, being formed from aluminum or other material having a greater coefficient of thermal expansion, will expand at a greater rate. Indeed, the differential A may experience a rise in temperature great enough to expand the extension 50 of the housing 2 sufficiently to separate the exterior surfaces 38 of the two cups 22 from the surfaces of the bores 56 for the bearing seats 50 and 52. Were it not for the conical back faces 42 on the cups 22 and the conical shoulders 58 in the bearing seats 52 and 54, the cups 22 would become loose in the housing 2 and destabilize the shaft 4, so that it would fail to rotate about a fixed axis X. However, as the extension 50 on the housing 2 expands radially, it also expands axially—more so in both directions than the steel shaft 4 and bearings 12 and 14. The axial expansion drives the conical shoulders 58 firmly against conical back faces 42 on the two cups 22, thereby preventing them from displacing radially, this even though separations may develop between the cylindrical surfaces 38 on the cups 22 and the surfaces of the bores 56 in which the cups 22 are located. The axis X of rotation remains fixed and stable with respect to the housing 2.

When the diameters of D of cylindrical exterior surfaces 38 for the cups 22 of the two bearings 12 and 14 are equal (FIG. 3) with the shaft 4 and bearings 12 and 14 being formed from steel and the housing 2 being formed from a aluminum, the following formula provides the optimum angle T:

$$T = \tan^{-1}\left[1.867\frac{L}{D}\right]$$

While the bearing system B has been described in connection with the differential A, particularly its housing 2 and pinion shaft 4, it is suitable for other applications as well—generally wherever a shaft having one coefficient of expansion rotates in a housing having a higher coefficient of expansion. Moreover, the tapered roller bearings 12 and 14, while ideally suited for such applications, may be replaced by other types of antifriction bearings that have the capacity to transfer both radial loads and axial loads—for example, angular contact ball bearings. Also, at least one of the inner raceways 30 and its thrust rib 32 may be formed directly on the shaft 4, in which event the shaft 4 and the cone 20 for that bearing are integral. Furthermore, the shoulders 58 and the back faces 42 which abut them need not be precisely conical, but may be beveled in some other near-conical configuration, such as arcuate. Apart from that, it is possible to achieve a measure of compensation and stability with only one of the cups 22 having a beveled back face 42 and the other having a back face that is squared off with respect to the axis X, and of course with the housing having shoulders of corresponding inclination. IN that variation, preferably the beveled back face 42 resides on the cup 22 of the tail bearing 14.

What is claimed is:

1. A machine comprising:
   a housing having first and second bearing seats, with each seat being defined by a bore and a shoulder at the end of the bore, the bores being aligned along an axis and opening away from each other and at least one of the shoulders being beveled in that it is obique to the axis;

a shaft extended through the bearing seats in the housing and being formed from a material having a lower coefficient of thermal expansion than the coefficient of thermal expansion for the material from which the housing is formed; and first and second antifriction bearings located between the housing and shaft for enabling relative rotation to occur between the shaft and the housing, the first bearing being at the first bearing seat and the second bearing being at the second bearing seat, each bearing including an outer race in the bearing seat for the bearing of which it is a part, the outer race having a raceway that is presented toward the axis and is inclined with respect to the axis and also having a back face that is against and conforms to the shoulder of the seat, each bearing also having an inner raceway carried by the shaft and presented outwardly away from the axis and toward the raceway of the outer race, the inner race being inclined with respect to the axis in the same direction as the raceway of the outer race, each bearing further including rolling elements arranged in a row between the raceway of its outer race and its inner raceway, the raceways of the first and second bearings being inclined downwardly toward each other, so that the bearings are mounted in opposition, the outer races being fixed in position with respect to the housing, the inner raceways being fixed in position with respect to the shaft.

2. A machine according to claim 1 wherein the back face of each outer race is beveled and oblique to the axis.

3. A machine according to claim 2 wherein the bearings are in preload.

4. A machine according to claim 3 wherein the rolling elements of each bearing are organized in a single row.

5. A machine according to claim 4 wherein the bores of the bearing seats in the housing are cylindrical and the outer races have cylindrical exterior surfaces; and wherein at ambient temperatures interference fits exist between the surfaces of the bearing seat bores and the exterior surfaces of the outer races.

6. A machine according to claim 4 wherein the shaft has first and second bearing seats located within the first and second bearing seats, respectively, of the housing; and wherein the first and second bearings have inner races that are fitted over the first and second bearing seats on the shaft with interference fits, the inner raceways for the bearings being on the inner races.

7. A machine according to claim 4 wherein the raceways lie within conical envelopes, and the rolling elements are tapered rollers.

8. A machine according to claim 4 wherein the housing is formed from aluminum and the shaft and bearings are formed from steel.

9. A machine according to claim 4 wherein the beveled shoulders of the housing and the beveled back faces on the outer races of the bearings are conical.

10. A machine for facilitating rotation about an axis, said machine comprising:

a metal housing having first and second bearing seats that are aligned along and concentric to the axis, the bearing seats having at their ends beveled shoulders which taper downwardly toward each other;

first and second outer races located in the first and second bearing seats, respectively, of the housing and being fixed in position with respect to the housing; each outer race having a beveled back face that abuts the beveled shoulder of its bearing seat in the housing and an outer raceway that is presented inwardly toward and is inclined with respect to the axis, the outer raceways of the first and second bearings being inclined downwardly toward each other;

a metal shaft extended through the bearing seats on the housing, the coefficient of thermal expansion for the metal of the shaft being less than the coefficient of thermal, expansion for the metal of the housing;

first and second inner raceways carried by the shaft in a fixed position on the shaft and presented outwardly away from the axis and toward the first and second outer raceways, respectively, the first inner raceway being inclined in the same direction as the first outer raceway and the second inner raceway being inclined in the same direction as the second outer raceway; and first rolling elements arranged in a row between the first outer and inner raceways and second rolling elements arranged in a row between the second inner and outer raceways.

11. A machine according to claim 10 wherein the bearing seats have cylindrical bores that lead up to the conical shoulders and the outer races have cylindrical exterior surfaces that are received in the cylindrical bores.

12. A machine according to claim 10 wherein at ambient temperatures interference fits exist between the surfaces of the cylindrical bores for the bearing seats in the housing and the cylindrical exterior surfaces of the outer races.

13. A machine according to claim 10 wherein the shoulders of the bearing seats and the back faces of the outer race are conical; wherein each conical shoulder and the conical back face which it abuts are inclined at the same angle with respect to the axis, so that the shoulders and back faces abut over substantial surface areas.

14. A machine according to claim 10 wherein the raceways lie within conical envelopes and the rolling elements are tapered rollers.

15. A machine according to claim 10 wherein the shaft has first and second bearing seats that are located within the first and second bearing seats of the housing; and further comprising first and second inner races fitted over the first and second bearing seats, respectively, of the shaft, the first and second inner raceways being on the first and second inner races, respectively.

16. A machine according to claim 15 wherein the shaft carries a pinion beyond the first bearing seat, and the housing is a differential housing that contains a ring gear which meshes with the pinion.

17. A machine according to claim 10 wherein no clearances exist between the rolling elements and the raceways between which they are located, whereby the bearings are in preload.

18. A differential comprising:

a metal housing having first and second bearing seats that are aligned along and concentric to the axis, the bearing seats having at their ends beveled shoulders which taper downwardly toward each other;

a ring gear in the housing;

a pinion meshing with the ring gear; first and second outer races located in the first and second bearing seats, respectively, of the housing; each outer race having a beveled back face that abuts the beveled shoulder of its bearing seat in the housing and an outer raceway that is presented inwardly toward and is inclined with respect to the axis, the outer raceways of the first and second bearings being inclined downwardly toward each other;

a metal shaft extended through the bearing seats on the housing, the shaft having first and second bearing seats located within the first and second bearing seats, respectively, of the housing and carrying the pinion beyond the first bearing seat, the coefficient of thermal expansion for the metal of the shaft being less than the coefficient of thermal expansion for the metal of the housing;

first and second inner races carried by the shaft in a fixed position on the shaft and having first and second inner raceways, presented outwardly away from the axis and toward the first and second outer raceways, respectively, the first inner raceway being inclined in the same direction as the first outer raceway and the second inner raceway being inclined in the same direction as the second outer raceway; and first rolling elements arranged in a row between the first outer and inner raceways and second rolling elements arranged in a row between the second inner and outer raceways.

* * * * *